United States Patent
Hellmann et al.

(10) Patent No.: US 12,051,832 B2
(45) Date of Patent: Jul. 30, 2024

(54) FUEL CELL SYSTEM WITH TWO FUEL CELL UNITS WHICH CAN BE OPERATED INDEPENDENTLY FROM EACH OTHER

(71) Applicant: Robert Bosch GmbH, Stuttgart (DE)

(72) Inventors: Mark Hellmann, Korntal (DE); Andreas Haeffelin, Vaihingen (DE)

(73) Assignee: Robert Bosch GmbH, Stuttgart (DE)

(*) Notice: Subject to any disclaimer, the term of this patent is extended or adjusted under 35 U.S.C. 154(b) by 104 days.

(21) Appl. No.: 17/611,451

(22) PCT Filed: May 14, 2020

(86) PCT No.: PCT/EP2020/063442
§ 371 (c)(1),
(2) Date: Nov. 15, 2021

(87) PCT Pub. No.: WO2020/229590
PCT Pub. Date: Nov. 19, 2020

(65) Prior Publication Data
US 2022/0238897 A1   Jul. 28, 2022

(30) Foreign Application Priority Data
May 16, 2019 (DE) ............. 10 2019 207 117.1

(51) Int. Cl.
*H01M 8/04007* (2016.01)
*H01M 8/04014* (2016.01)
(Continued)

(52) U.S. Cl.
CPC ... *H01M 8/04074* (2013.01); *H01M 8/04014* (2013.01); *H01M 8/04268* (2013.01); *H01M 8/249* (2013.01); *H01M 2250/20* (2013.01)

(58) Field of Classification Search
CPC ......... H01M 8/04014; H01M 8/04037; H01M 8/04074; H01M 8/249; H01M 8/04268; H01M 2008/1293; H01M 2250/20
See application file for complete search history.

(56) References Cited

U.S. PATENT DOCUMENTS 6,294,278 B1 * 9/2001 Wohr ............. B60L 58/33
   429/442
2001/0053469 A1 * 12/2001 Kobayashi ....... H01M 8/04268
   429/415

(Continued)

FOREIGN PATENT DOCUMENTS

DE   102015015635 A1   6/2017
EP      1009050 A2   6/2000

OTHER PUBLICATIONS

Translation of International Search Report for Application No. PCT/EP2020/063442 dated Aug. 12, 2020 (2 pages).

*Primary Examiner* — Brian R Ohara
*Assistant Examiner* — Brent C Thomas
(74) *Attorney, Agent, or Firm* — Michael Best & Friedrich LLP

(57) ABSTRACT

The invention relates to a fuel cell system (200) having at least two fuel cell units (210, 220) that are respectively designed to be operated independently from each other, wherein the fuel cell system (200) is designed to provide an amount of heat for activating a second fuel cell unit (210) of the at least two fuel cell units (210, 220) from waste heat of a first fuel cell unit (220).

12 Claims, 4 Drawing Sheets

(51) Int. Cl.
*H01M 8/04223* (2016.01)
*H01M 8/249* (2016.01)

(56) References Cited

U.S. PATENT DOCUMENTS

| | | | |
|---|---|---|---|
| 2003/0106726 A1* | 6/2003 | Yoshii | B60L 58/40 |
| | | | 903/917 |
| 2006/0172176 A1* | 8/2006 | MacBain | H01M 8/04089 |
| | | | 429/495 |
| 2010/0266918 A1 | 10/2010 | Yi et al. | |
| 2016/0036070 A1* | 2/2016 | Peterson | H01M 8/04723 |
| | | | 429/429 |

* cited by examiner

FUEL CELL SYSTEM WITH TWO FUEL CELL UNITS WHICH CAN BE OPERATED INDEPENDENTLY FROM EACH OTHER

BACKGROUND OF THE INVENTION

Solid oxide fuel cells (SOFC) have hitherto been used mainly in stationary applications. They are distinguished by a high operating temperature and a comparatively high electrical efficiency. One great advantage of an SOFC, for example, compared with a polymer electrolyte fuel cell (PEM-FC) is that it can be operated both without expensive noble metals and directly with hydrogen or other fuels. In recent years, there has been increasing research into metal-supported SOFCs, but these have hitherto only been operated as prototypes. These are distinguished by a low operating temperature and lower heat capacities. Despite these advances, it is necessary, in the case of an SOFC for example, to supply a considerable amount of energy in the form of heat when such a fuel cell is put into operation, in order that the conductivity of the electrolyte of the SOFC is sufficiently high and electrical power can be provided.

SUMMARY OF THE INVENTION

In an illustrative SOFC stack with 200 kW power for a heavy-duty truck, the amount of energy during heating is approximately 90 kWh or, correspondingly, 3 kg of hydrogen. This energy must be supplied at each cold start and cannot be used immediately after parking the vehicle. From the point of view of efficiency, short operating times are therefore ruled out for solid electrolyte fuel cells. If, in the case of mobile use of a solid electrolyte fuel cell, only part of the load is required in the current traffic situation, the entire heat capacity of the fuel cell stack must nevertheless be heated.

On the other hand, in the case of a solid electrolyte fuel cell, the required cathode gas, such as, for example, air, is compressed on the cathode side by a blower and preheated by means of a heat exchanger before it reaches the cathode space. The exhaust gas heated still further by the heat of reaction then escapes into the environment.

The invention provides a fuel cell system which has at least two fuel cell units and which are each designed to be operated independently from each other, a method for operating such a fuel cell system for a vehicle having such a fuel cell system, as well as a computer program product for carrying out such a method, and a machine-readable storage medium for storing the computer program product, which at least partially achieve the objects described.

The invention is based on the insight that when the required total power of a fuel cell system is divided between a plurality of fuel cell units which can be operated independently from each other, the quantity of heat for activating a second inactive fuel cell unit can be supplied from the waste heat of a first active fuel cell unit.

The fuel cell system according to the invention has at least two fuel cell units, which are each designed to be operated independently from each other. The fuel cell system is designed to provide a quantity of heat for activating a second fuel cell unit of the at least two fuel cell units from waste heat of a first fuel cell unit of the at least two fuel cell units.

In such a fuel cell system, the fuel cell units can be divided, with respect to the respective maximum power which can be provided, in accordance with the power requirements on the fuel cell system.

For a mobile application of the fuel cell system according to the invention, a first fuel cell unit can be designed to provide a basic power and can have a second fuel cell unit whose power, together with the basic power of the first fuel cell unit, provides a peak power for the mobile application.

Each of the at least two fuel cell units, which can exchange heat for the purpose of activation, is designed in such a way that it can supply electrical energy to a load independently of other fuel cell units of the fuel cell system, and each fuel cell unit is designed to enter an operationally ready state independently of the other fuel cell units in order to generate current in the active state. This can be achieved by the provision, in heat exchangers of the fuel cell units, of a device which makes it possible to increase the temperature of a fuel cell stack of the fuel cell unit to such an extent, by burning fuel which is also provided for operating the fuel cells, that it is possible for the fuel cell unit to be activated.

The fact that the fuel cell units are designed to be operated independently from each other makes it possible to put all the fuel cell units into the operationally ready state in parallel in the case of a quick start of the fuel cell system. In the case of fuel cell units which have different heat capacities or achieve operational readiness more quickly for some other reason, this can be further assisted by providing the fuel cell units which are not yet ready for operation with a quantity of heat from the waste heat of active fuel cell units. Heating is then accomplished in a shorter time. Particularly after the fuel cell units of the fuel cell system are ready for operation, the fuel cell units can be operated independently from each other.

In order to be able to supply load peaks in respect of electrical capacity, an energy buffer, such as a battery or a capacitor, can additionally be provided.

A fuel cell system of this type can also have a larger number of fuel cell units, e.g. for mobile applications, such as in a vehicle which is supplied with electrical energy from the fuel cell system. For example, a first fuel cell unit can be provided for an electrical base load for traffic in cities, a second fuel cell unit can cover the additional power requirement of long-distance traffic, including motorways for example, and a third fuel cell unit can be provided for the additional power requirement under extreme conditions, such as, for example, mountain travel in the Alps.

Here, the at least two fuel cell units are designed to be operated independently from each other, thus making it possible to operate the respectively suitable fuel cell unit in accordance with its capacity for a current power requirement for electrical energy from the fuel cell system. As a result, it is only ever necessary to supply the quantity of heat for activating the respective fuel cell unit which is designed to make the currently required power available. This quantity of heat can be smaller than the quantity of heat for the overall system, which must be designed to provide maximum power. The quantity of heat thus saved corresponds to the energy saving potential of such a fuel cell system.

By activating an inactive fuel cell unit by means of a quantity of heat of the waste air of an active fuel cell unit, the energy which would otherwise have to be supplied for heating by burning fuel can be saved. A change from one operating state of the fuel cell system to an operating state which can make available a higher power is thus associated with less power loss.

Fuel cell systems can have different fuel cell stacks in the fuel cell units, which are equipped with different fuel cell types. In particular, fuel cells based on solid electrolytes require a certain quantity of heat for activation in order to transfer the solid electrolytes to a conductive state at a correspondingly elevated temperature. However, other fuel cell types may also require a certain quantity of heat for activation.

The solid oxide fuel cell (SOFC) is a type of fuel cell that is operated at an elevated operating temperature of, for example, 650-1000° C. However, suitable measures may be employed to lower the range of the operating temperature.

The electrolyte of this cell type consists of a solid ceramic material, which is capable of conducting oxygen ions, especially at a relatively high temperature, but has an insulating effect for electrons. It is possible to use solid oxide ceramics, typically yttrium-stabilized zirconium oxide, more precisely zirconium dioxide partially stabilized with yttrium oxide or fully stabilized with yttrium oxide, for the electrolytes of such SOFCs. It is also possible to use strontium- and magnesium-doped lanthanum gallium oxide (LSGM) or gadolinium-doped cerium oxide. Furthermore, there are organic solid electrolytes, which are usually based on polymers, and inorganic crystalline or amorphous solid electrolytes, which, however, are typically operated at a much lower temperature.

According to one embodiment of the invention, it is proposed that each of the at least two fuel cell units has a preheater which is designed to be operated independently from the other preheaters.

Such a preheater can be used to bring an inactive fuel cell unit to an operating temperature, for example by preheating a cathode gas fed to the cathode space of the fuel cell unit.

According to one embodiment of the invention, it is proposed that the at least two fuel cell units each have a blower for a cathode gas which is designed to be operated independently from the other blowers.

As a result of the independence of the blowers for a cathode gas and of the preheater, it is possible to ensure that, for the respective requirement of an electrical load connected to the fuel cell system, the power provided by the fuel cell system can be selected by means of a fuel cell unit selected with respect to its capacity.

According to one embodiment of the invention, it is proposed that the fuel cell system is designed to provide a quantity of heat for activating an inactive second fuel cell unit of the at least two fuel cell units by means of waste air of an active first fuel cell unit of the at least two fuel cell units.

By virtue of the fact that the fuel cell system can use the waste air of a first fuel cell unit to bring an inactive second fuel cell unit to an operating temperature for activation, the consumption of the fuel which is otherwise required to heat a fuel cell unit to an operating temperature is avoided. This is because the waste air of a first fuel cell unit can contain a large proportion of the waste heat of the first fuel cell unit, and this can then be supplied to the second fuel cell unit.

According to another embodiment of the invention, it is proposed that the fuel cell system is designed to keep an inactive second fuel cell unit of the at least two fuel cell units ready for operation by means of a quantity of waste heat of a first active fuel cell unit of the at least two fuel cell units.

The quantity of waste heat of the first active fuel cell unit can be supplied to the second fuel cell unit in the form of the waste air from the cathode of the first fuel cell unit.

In order to keep such a second fuel cell unit ready for operation, it must be kept at the correspondingly high temperature, even though this second fuel cell unit is not active. This can be achieved by supplying the waste heat of a first fuel cell unit which is active to the second fuel cell, so that the second fuel cell can be kept at the operating temperature in the inactive state.

According to another embodiment of the invention, it is proposed that the fuel cell system is designed to keep a second inactive fuel cell unit ready for operation by means of a quantity of waste heat of a first active fuel cell unit of the at least two fuel cell units, and to supply current for at least one assembly by means of the first fuel cell unit.

For example, a vehicle that has such a fuel cell system and that has been parked can supply a cooling unit by means of a first fuel cell unit and keep a second fuel cell unit ready for operation by means of the waste heat of the first fuel cell unit in order to enable the vehicle to continue its journey without an additional waiting time or additional consumption of fuel for activating, for example, a more powerful fuel cell unit.

According to another embodiment of the invention, it is proposed that the fuel cell system is designed to provide the quantity of heat by introducing at least some of the waste air of the first fuel cell unit into a cathode space of the second fuel cell unit.

By virtue of this form of thermal coupling between the first fuel cell unit and the second fuel cell unit, the second fuel cell unit can be brought to an operating temperature for activation or kept at a certain temperature level without further expenditure of thermal energy. Since the hot waste air of the first fuel cell unit is passed directly into the cathode space of the second fuel cell unit, the utilization of the heat of the waste-heat waste air flow is particularly efficient. In this case, during this activation phase, which is associated with heating of the fuel cell unit, it is possible to dispense with an additional cathode gas flow, which is an air flow in the case of operation of the fuel cell unit with air, with operation of the blower of the second fuel cell unit. Such a waste-heat waste air flow from the first fuel cell unit can be introduced either completely or only to a certain extent into the cathode space of the second fuel cell unit.

A blower of the second fuel cell unit does not have to be operated during this provision of the heat from the first fuel cell unit.

According to one embodiment of the invention, it is proposed that the fuel cell system is designed to provide the quantity of heat for the second fuel cell units from the waste heat of the first fuel cell unit by means of a coupling heat exchanger.

As a result of the heat transfer by means of a coupling heat exchanger from the first fuel cell unit to the second fuel cell unit, the increase in pressure loss for the cathode gas of the first fuel cell unit remains limited substantially to the loss in the cathode space of the first fuel cell unit since a pressure loss of the waste air of the first fuel cell unit is comparatively low in a coupling heat exchanger.

To control the transfer of the quantity of heat between the first fuel cell unit and the second fuel cell unit, two flaps can be provided for controlling gas flows. In addition, provision can be made for the heat transfer capacity of the coupling heat exchanger provided for this purpose in the second fuel cell unit to be less than the heat transfer capacity of the heat exchanger of the independently operable second fuel cell unit.

When transferring the heat for activation, for example, of the inactive second fuel cell unit, provision can be made for a blower for the cathode gas of the second fuel cell unit to be in operation simultaneously. This ensures that a quantity of heat from the waste-heat waste air flow of the first fuel cell unit, which is passed through the coupling heat exchanger and, by means of heat transfer in the coupling heat exchanger to the cathode gas of the second fuel cell unit, is introduced with this cathode gas of the second fuel cell unit into the cathode space of the second fuel cell unit and thus heats up the entire second fuel cell unit.

According to one embodiment of the invention, it is proposed that the fuel cell system is designed to provide a quantity of heat for the second fuel cell units by means of waste air of the first fuel cell unit by means of a coupling heat exchanger which is arranged in a feed path of a cathode gas between a blower and a cathode space of the second fuel cell unit.

According to one embodiment of the invention, it is proposed that the fuel cell system is designed to provide the quantity of heat by means of a heat exchanger which is flowed through by both a cathode gas of the second fuel cell unit and by waste air of the first fuel cell unit.

The air flow introduced into the cathode space of the second fuel cell unit by means of the blower of the second fuel cell unit is passed through the additional coupling heat exchanger, and this coupling heat exchanger makes possible the heat transfer of the waste heat of the first fuel cell unit to the second fuel cell unit by virtue of the fact that the waste air flow of the first fuel cell unit additionally flows through it.

According to another embodiment of the invention, it is proposed that the fuel cell system is designed to provide the quantity of heat by means of a coupling heat exchanger which is flowed through by both a cathode gas of the second fuel cell unit and, optionally, by means of at least one controlled flap, by waste air of the first fuel cell unit.

By means of such a flap, it is possible to control the heat transfer from the waste air flow of the first fuel cell unit to the coupling heat exchanger of the second fuel cell unit.

According to another embodiment of the invention, it is proposed that the fuel cell system is designed to provide the quantity of heat of the first fuel cell unit to the second fuel cell unit, optionally without control by a flap.

Such a simple fuel cell system which has at least two fuel cell units and does not require any actuation of flaps to control the heat transfer from the first fuel cell unit to the second fuel cell unit makes possible a fuel cell system which has no flaps for this control.

In such a system, there is always a flow through the heat transfer system for the heat exchange between the first and second fuel cell units when the first fuel cell unit is active, and heat transfer can be achieved solely by controlling the blower of the second fuel cell unit.

Further details of such a simple fuel cell system are described in the exemplary embodiment.

According to another embodiment of the invention, it is proposed that the fuel cell system is designed to provide the quantity of heat by means of a triple-flow heat exchanger which is flowed through by both a cathode gas of the second fuel cell unit and at least some of the waste air of the first fuel cell unit.

With such a triple-flow heat exchanger for the heat transfer from the first fuel cell unit to the second fuel cell unit, it is possible to ensure that the space requirement for the additional heat exchanger is reduced.

According to the invention, a method for operating a fuel cell system of a vehicle having a fuel cell system as described above is provided. In this case, a future power requirement of the vehicle to be generated by the fuel cell system is determined in one step. In a further step, the current power of the fuel cell system is compared with the future power requirement determined. And in a further step of the method, the second fuel cell unit is activated by means of the waste heat of the first fuel cell unit of the fuel cell system in accordance with the result of the comparison of the current power of the fuel cell system and the future power requirement determined.

The advantage of such a method is that, given a knowledge of a future power requirement, at least the second fuel cell unit, which can provide the additional power requirement, can be transferred from an inactive operating state into an active operating state, in which the corresponding quantity of heat is provided by means of the first fuel cell unit. As a result, the second fuel cell unit can be brought to an operating temperature in good time in order to provide the power then required.

According to another embodiment of the method, the future power requirement of the vehicle from the fuel cell system is determined with the aid of a route planning system.

By using route information, it is possible to accurately estimate a power requirement of a vehicle that has such a fuel cell system. As a result, there is sufficient time available to heat the individual fuel cell elements by using exhaust gas heat. Only in the case of spontaneously occurring high power demands on the fuel cell system, possibly in combination with too low a battery power, is it necessary to heat the fuel cell system or individual fuel cell elements exclusively by the combustion heat of a fuel.

Such activation by means of a quantity of heat, which is provided, for example, from the waste heat of the first fuel cell system, makes it possible both to prepare a stationary vehicle in which a fuel cell element assists stand-by operation for the onward journey and to enable an increased power requirement due, for example, to a mountainous route, to be provided since such a route planning system can match a planned route with the topological conditions or the traffic conditions.

According to one embodiment of the invention, it is proposed that the future requirement for electrical energy is estimated on the basis of a data representation of the future traffic situation or the future course of the route.

The future traffic situation and the future course of the route can originate from different sources, which are either already represented in terms of data or are converted in such a way that they are represented in terms of data and are suitable for further data processing.

In the method according to the invention, the future energy demand is estimated on the basis of a multiplicity of influencing factors. The estimation can take into account that, depending on the traffic situation, different average speeds result over the various sections of the route. For this estimation, live traffic data, in particular traffic jam predictions from an online navigation system, can be used as input variables for the estimation.

Furthermore, the topology of a planned route of the mobile platform including energy recovery by recuperation as well as traffic light phases can be taken into account.

The invention also comprises a vehicle which has an electric drive motor, at least one fuel cell system, at least one auxiliary energy store and a control and prediction unit for controlling the energy flow between the auxiliary energy store and the fuel cell system and/or at least the drive motor.

The invention proposes a computer program product comprising instructions which, when the program is executed by a computer, cause the computer to execute the above-described method for operating a vehicle.

A machine-readable storage medium on which the computer program is stored is furthermore proposed.

BRIEF DESCRIPTION OF THE DRAWINGS

Exemplary embodiments of the invention are illustrated in FIGS. 1 to 4 and in the following explanations and are explained in greater detail below.

Specifically.

DETAILED DESCRIPTION

Figure 1:
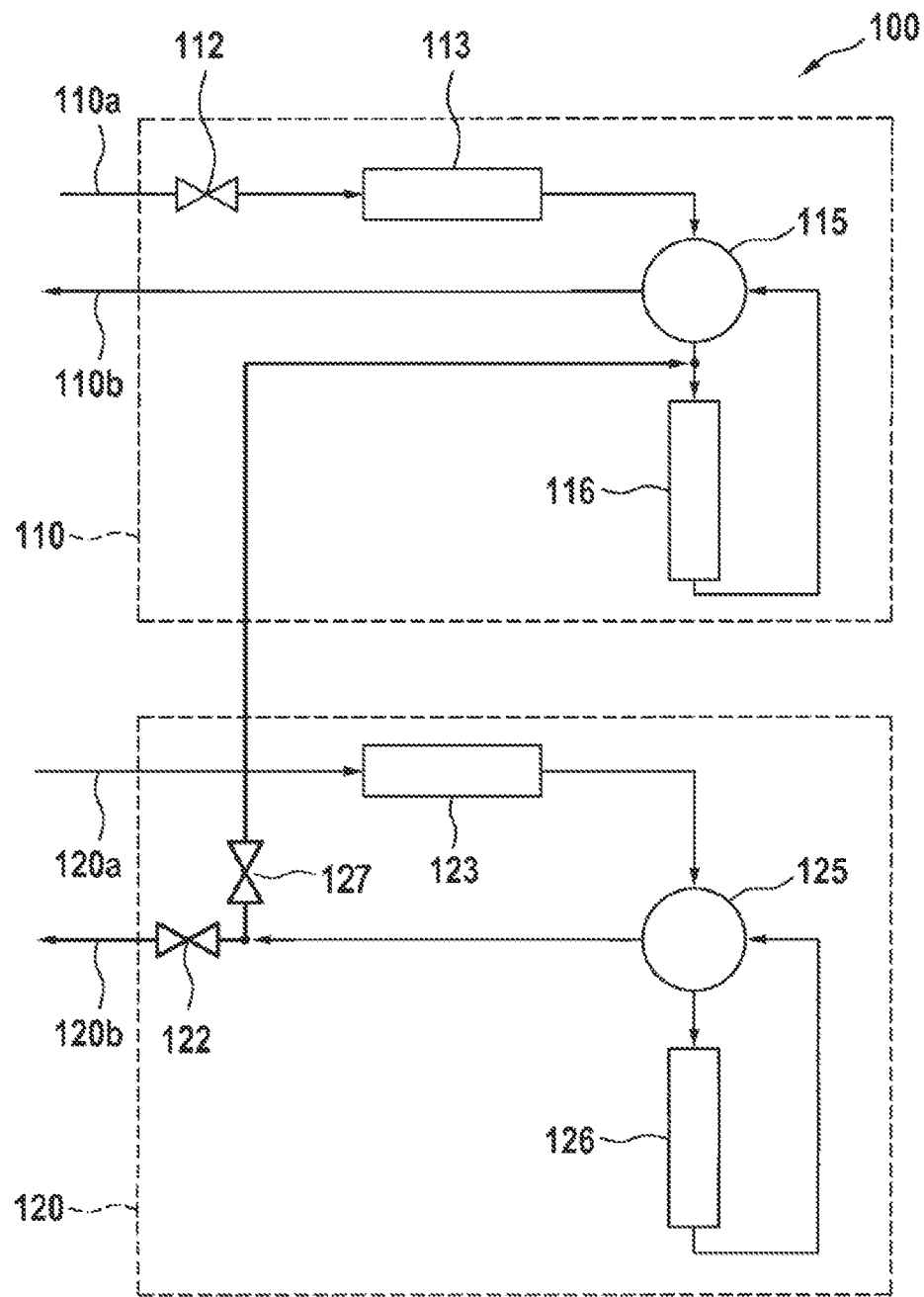
FIG. 1 shows a schematic view of a cathode side of a fuel cell system which has two fuel cell units.

FIG. 1 shows schematically a cathode side of a fuel cell system 100, which has a first fuel cell unit 120 and a second fuel cell unit 110. The first fuel cell unit 120 has a blower 123, which transfers air or some other cathode gas from a gas inlet 120a, via a heat exchanger 125, into a cathode space 126 of the first fuel cell unit 120. From the outlet of the cathode space 126, the gas, which is heated further owing to the heat of reaction of the fuel cell, is passed via the heat exchanger 125 of the first fuel cell unit 120 from the waste air outlet of the heat exchanger 125 and, via a flap 122, to an outlet 120b of the first fuel cell unit.

The second fuel cell unit 110 has a blower 113, which transfers the cathode gas from a gas inlet 110a, via a heat exchanger 115, into a cathode space 116 of the second fuel cell unit 110. In this case, a flap 112 for controlling the gas flow is arranged between the gas inlet 110a and the blower 113. From the outlet of the cathode space 116 of the second fuel cell unit, the air, which is heated further owing to the heat of reaction of the fuel cell of the second fuel cell unit 110 during active operation of the fuel cell unit 110, is passed via a heat exchanger 115 at an outlet 110b of the second fuel cell unit.

The fuel cell system 100 has a connection for a gas flow of the first fuel cell unit 120 and the second fuel cell unit 110. This connection is arranged between the waste air outlet of the heat exchanger 125 of the first fuel cell unit 120 and the flap 122 and can be fed in a controlled manner via a coupling flap 127 between the supply air outlet of the heat exchanger 115 and the inlet of the cathode space 116 of the second fuel cell unit 110.

When the outlet flap 122 of the first fuel cell unit is closed and the coupling flap 127 is open and the flap 112 of the second fuel cell unit is closed, the warm waste air of the first fuel cell unit 120 can be introduced directly into the cathode space 116 of the second fuel cell unit and leaves the second fuel cell unit via its gas outlet 110b.

As a result, the quantity of heat of the waste air of the active first fuel cell unit 120 can heat the still inactive fuel cell unit 110, e.g. to a temperature which is sufficient to activate the second fuel cell unit 110.

Figure 2:
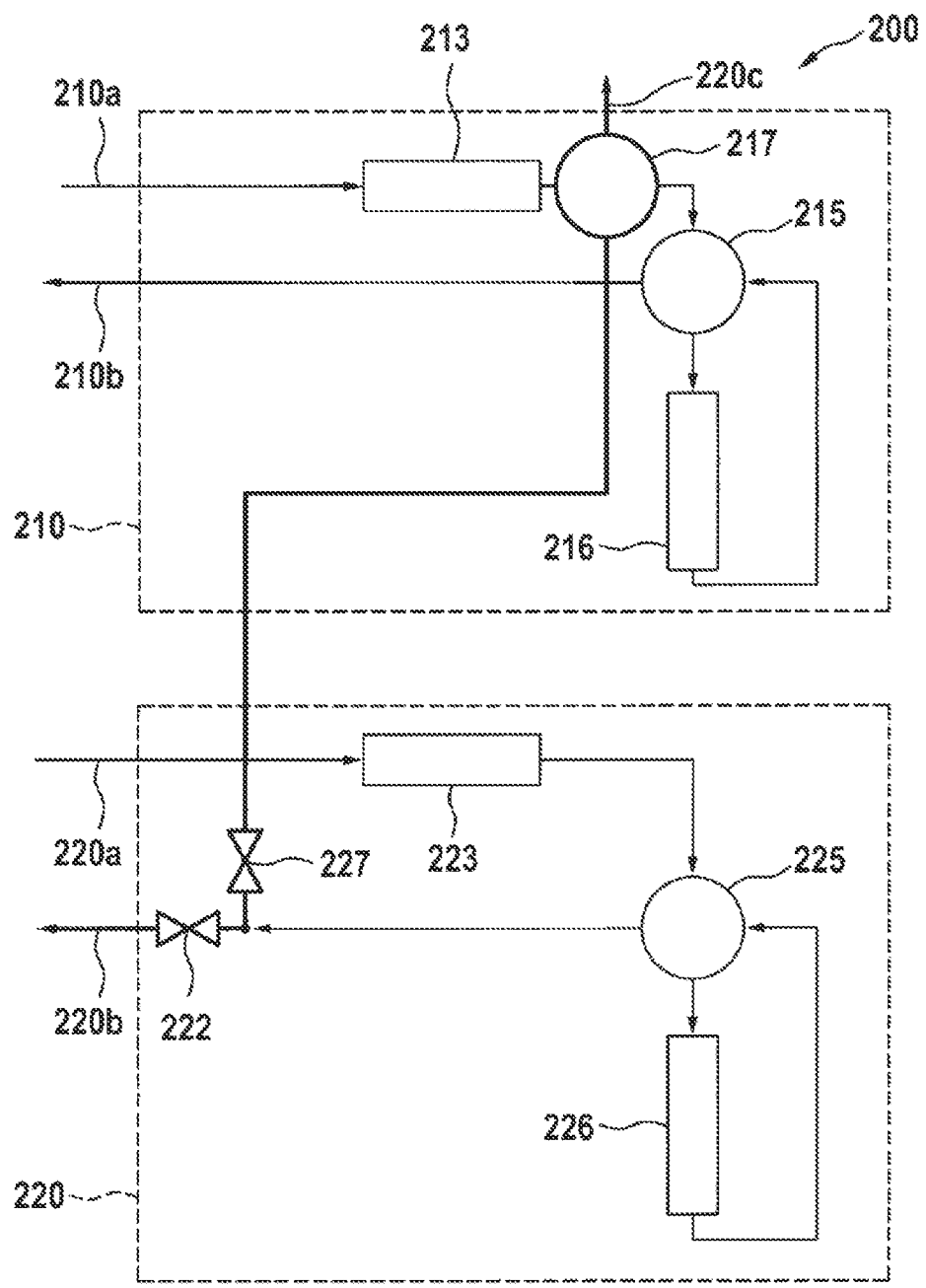
FIG. 2 shows a schematic view of a cathode side of a fuel cell system which has two fuel cell units and a coupling heat exchanger.

FIG. 2 describes schematically, as a further embodiment of the invention, a cathode side of a fuel cell system 200, which has a first fuel cell unit 220 and a second fuel cell unit 210, and which differs from the exemplary embodiment of fuel cell system 100, as illustrated in FIG. 1, only in respect of the second fuel cell unit 210. In contrast to the second fuel cell unit 110 of FIG. 1, the second fuel cell unit 210 has no flap between the cathode gas inlet 210a and the blower 213 for controlling the thermal coupling between the first fuel cell unit 220 and the second fuel cell unit 210. However, the second fuel cell unit 210 additionally has, between the blower 213 and the heat exchanger 215, a coupling heat exchanger 217, through which the cathode gas of the second fuel cell unit 210 flows before the cathode gas reaches the inlet of the heat exchanger 215 of the second fuel cell unit 210.

The coupling of the two fuel cell units 220, 210 of the fuel cell system 200 in FIG. 2, e.g. to activate the second fuel cell unit 210, can be achieved by closing the output flap 222 of the first fuel cell unit 220 and opening the coupling flap 227. The waste air of the first fuel cell unit 220 then flows via this coupling flap 227 into the coupling heat exchanger 217 and leaves the coupling heat exchanger 217 via an outlet 220c. The cathode gas flowing in from the cathode gas inlet 210a of the second fuel cell unit 210 and transferred or compressed by the blower 213 flows through the coupling heat exchanger 217 and, in the process, absorbs the heat of the waste air of the first fuel cell unit 220 in order, for example, to heat up the second fuel cell unit 210 by means of a heated cathode gas for the purpose of activating the second fuel cell unit 210. For all exemplary embodiments, the cathode gas can be air from the environment of the fuel cell system.

Figure 3:
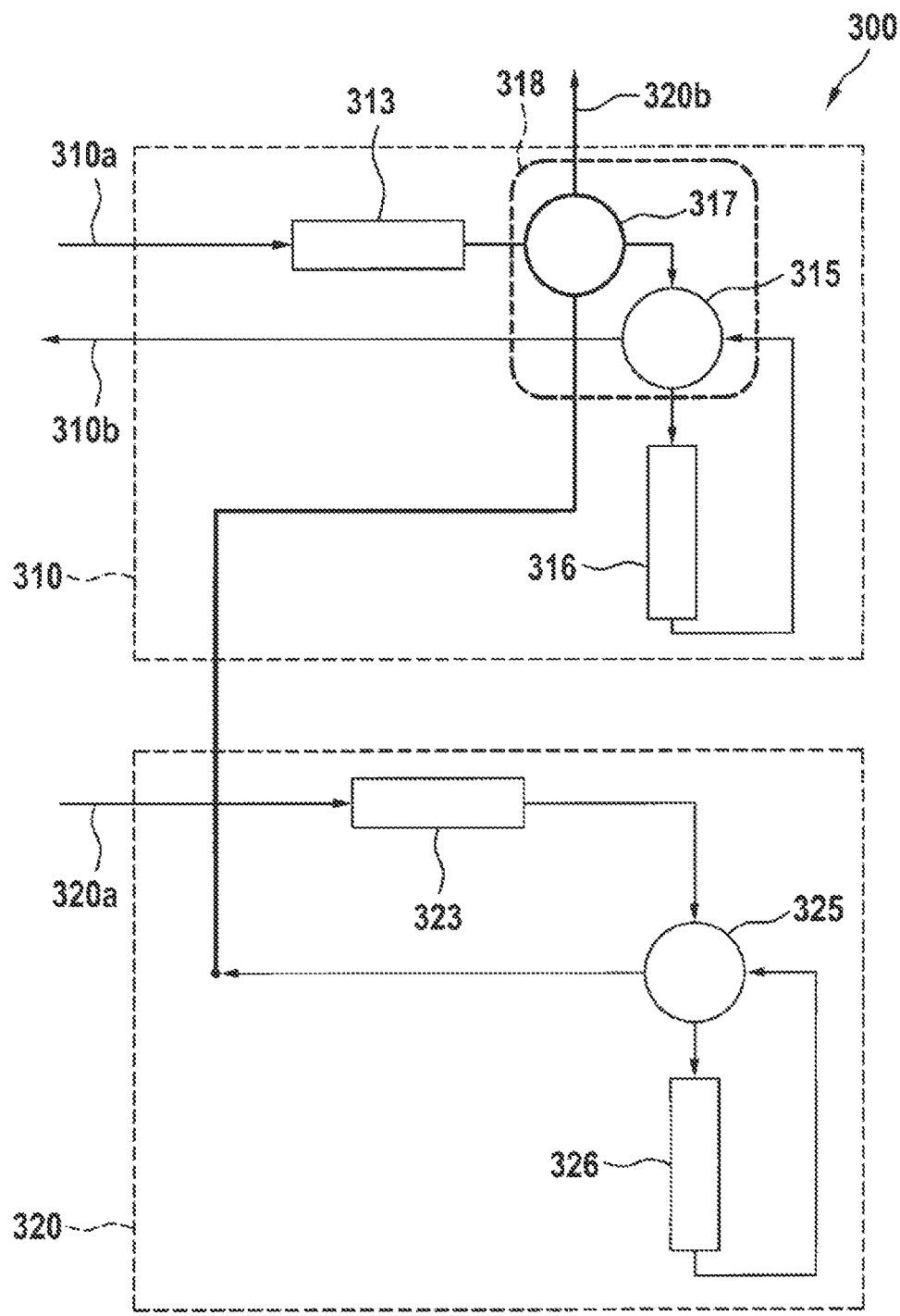
FIG. 3 shows a schematic view of a cathode side of a fuel cell system which has two fuel cell units, a coupling heat exchanger and the optional provision of the quantity of heat without flaps.

FIG. 3 describes schematically, by way of example, another embodiment of the invention, a cathode side of a fuel cell system 300, which has a first fuel cell unit 320 and a second fuel cell unit 310. In contrast to the two embodiments described above, neither the first fuel cell unit 320 nor the second fuel cell unit 310 has a flap for controlling the heat transfer from the first fuel cell unit 320 to the second fuel cell unit 310 in this fuel cell system 300.

In comparison with the first fuel cell unit 220 described in FIG. 2, the waste air of the first fuel cell unit 320 of the fuel cell system 300 in FIG. 3 is always passed through a coupling heat exchanger, which, as described in FIG. 2, is between a blower 313 of the second fuel cell unit 310 and the heat exchanger 315 of the second fuel cell unit 310, and leaves the coupling heat exchanger via an outlet 320b into an environment of the fuel cell system 300.

The control of the thermal coupling between the two fuel cell units 320, 310 is controlled during active operation of the first fuel cell unit 320 solely by the blower 313 of the second fuel cell unit 310 being activated or being inactive.

FIG. 3 indicates that the heat exchanger of the second fuel cell unit 315 and the coupling heat exchanger 317 can also be embodied in a system 318 in the form of a triple-flow heat exchanger 318. Such a triple-flow heat exchanger can be used in general in such fuel cell systems and especially in the exemplary embodiment described above in FIG. 2.

For a mobile fuel cell system as described above, with which a vehicle is equipped, it may be advantageous to use three fuel cell units. A first fuel cell unit can be designed for the generation of an electrical base load in urban traffic and in interurban traffic (in the case of the HD-CV (Heavy Duty Commercial Vehicle), this would be, for example, a stack with a power of 75 kW). A second fuel cell unit can be designed for an additional power requirement in the case of long-distance traffic on freeways (in the case of HD-CV this would be, for example, a second stack with a power of a further 75 kW). The third fuel cell unit can be designed for an additional power requirement under extreme conditions, such as, for example, for mountain travel over the Alps (in the case of HD-CV, this would be, for example, a third stack with a power of a further 200 kW).

Figure 4:
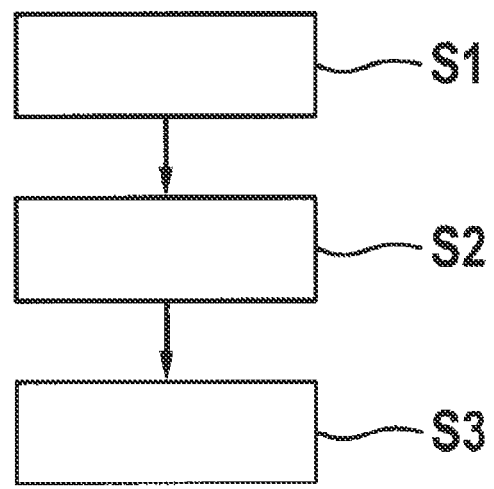
FIG. 4 shows a flowchart of a method for operating a vehicle.

FIG. 4 describes a flowchart of a method for operating a fuel cell system of a vehicle having a fuel cell system as described above. In this case, a future power requirement of the vehicle to be generated by the fuel cell system is determined in a step S1. In a further step S2, the current power of the fuel cell system is compared with the future power requirement determined. And in a further step S3 of the method, the second fuel cell unit is activated by means of the waste heat of the first fuel cell unit of the fuel cell system in accordance with the result of the comparison of the current power of the fuel cell system and the future power requirement determined. Here, the determination of the future power requirement of the vehicle from the fuel cell system can be supported by a route planning system.

What is claimed is:

1. A fuel cell system (100, 200, 300) which has at least two fuel cell units (110, 120, 210, 220, 310, 320) that are each designed to be operated independently from each other, wherein the fuel cell system (100, 200, 300) is configured to provide a quantity of heat for activating a second fuel cell unit (210, 310) of the at least two fuel cell units from waste heat of a first fuel cell unit (220, 320) of the at least two fuel cell units,
  wherein, to provide the quantity of heat, the fuel cell system (100, 200, 300) includes a triple-flow heat exchanger (318) having a first input, a second input, and a third input that are separately connected to the triple-flow heat exchanger (318),
    wherein the first input is flowed through by a cathode gas of the second fuel cell unit (210, 310) flowing from a cathode space (316) of the second fuel cell unit (210, 310),
    wherein the second input is flowed through by at least some waste air of the first fuel cell unit (220, 320), and
    wherein the third input is flowed through by gas from a gas inlet (310*a*) of the second fuel cell unit (210, 310) after the gas has passed through a blower (313) of the second fuel cell unit (210, 310) but before the gas flows through the cathode space (316) of the second fuel cell unit (210, 310).

2. The fuel cell system (100, 200, 300) as claimed in claim 1, characterized in that each of the at least two fuel cell units (110, 120, 210, 220, 310, 320) has a preheater which is configured to be operated independently from preheaters of others of the at least two fuel cell units.

3. The fuel cell system (100, 200, 300) as claimed in claim 1, characterized in that the at least two fuel cell units (110, 120, 210, 220, 310, 320) each have a blower (113, 123, 213, 223, 313, 323) for a cathode gas, wherein the blower is configured to be operated independently from blowers of others of the at least two fuel cell units.

4. The fuel cell system (100, 200, 300) as claimed in claim 1, characterized in that the fuel cell system (100, 200, 300) is configured to provide a quantity of heat for activating an inactive second fuel cell unit (110, 210, 310) of the at least two fuel cell units by means of waste air of an active first fuel cell unit (120, 220, 320) of the at least two fuel cell units.

5. The fuel cell system (100, 200, 300) as claimed in claim 1, characterized in that the fuel cell system (100, 200, 300) is configured to keep an inactive second fuel cell unit (110, 210, 310) of the at least two fuel cell units ready for operation by means of a quantity of waste heat of a first active fuel cell unit (120, 220, 320) of the at least two fuel cell units.

6. The fuel cell system (100, 200, 300) as claimed in claim 1, characterized in that the fuel cell system is configured to provide the quantity of heat for the second fuel cell unit (110, 210, 310) from the waste heat of the first fuel cell unit by means of a coupling heat exchanger.

7. The fuel cell system as claimed in claim 1, characterized in that the fuel cell system is configured to provide a quantity of heat for the second fuel cell unit by means of waste air of the first fuel cell unit (220, 320) by means of a coupling heat exchanger (217, 317, 318) which is arranged in a feed path of a cathode gas between a blower (213, 313) and a cathode space (216, 316) of the second fuel cell unit.

8. The fuel cell system (100, 200, 300) as claimed in claim 1, characterized in that the fuel cell system is configured to provide the quantity of heat by means of at least one controlled flap (122, 127, 222, 227) that provides the waste air of the first fuel cell unit (220, 320) to the second fuel cell unit (210, 310).

9. The fuel cell system (100, 200, 300) as claimed in claim 1, characterized in that the fuel cell system is configured to provide the quantity of heat of the first fuel cell unit (120, 220, 320) to the second fuel cell unit (110, 210, 310) without a controlled flap.

10. A method for operating the fuel cell system (100, 200, 300) as claimed in claim 1 in a vehicle, the method comprising the steps of:
  determining a future power requirement of the vehicle (S1) to be generated by the fuel cell system;
  comparing the current power of the fuel cell system with the future power requirement (S2) determined; and
  activating the second fuel cell unit by means of the waste heat of the first fuel cell unit of the fuel cell system (S3) in accordance with the result of the comparison of the current power of the fuel cell system and the future power requirement determined.

11. The method as claimed in claim 10, wherein the future power requirement of the vehicle from the fuel cell system (100, 200, 300) is determined with the aid of a route planning system.

12. A non-transitory, computer-readable medium containing instructions which, when executed by a computer, cause the computer to execute the method as claimed in claim 10.

* * * * *